(12) United States Patent
Chatterjee et al.

(10) Patent No.: US 9,569,880 B2
(45) Date of Patent: Feb. 14, 2017

(54) ADAPTIVE ANISOTROPIC FILTERING

(71) Applicant: Intel Corporation, Santa Clara, CA (US)

(72) Inventors: Prosun Chatterjee, Bangalore (IN); Larry Seiler, Boylston, MA (US); Joy Chandra, Bangalore (IN); Benjamin R. Pletcher, Mather, CA (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 14/140,180

(22) Filed: Dec. 24, 2013

(65) Prior Publication Data

US 2015/0178975 A1 Jun. 25, 2015

(51) Int. Cl.
*G06T 15/04* (2011.01)

(52) U.S. Cl.
CPC ........... *G06T 15/04* (2013.01); *G06T 2210/36* (2013.01)

(58) Field of Classification Search
CPC ............................. G06T 15/04; G06T 2210/36
See application file for complete search history.

(56) References Cited

U.S. PATENT DOCUMENTS

| | | | | |
|---|---|---|---|---|
| 5,003,618 A * | 3/1991 | Meno | ........................ | G06T 5/20 382/261 |
| 5,446,502 A * | 8/1995 | Lebowsky | ............. | H04N 5/208 348/607 |
| 5,548,709 A * | 8/1996 | Hannah | ................. | G06T 11/001 345/501 |
| 6,005,582 A * | 12/1999 | Gabriel | ................... | G06T 11/40 345/586 |
| 6,184,894 B1 * | 2/2001 | Rosman | ................ | G06T 3/4007 345/428 |
| 6,292,193 B1 * | 9/2001 | Perry | ...................... | G06T 15/04 345/428 |
| 6,452,603 B1 * | 9/2002 | Dignam | .................. | G06T 15/04 345/428 |
| 6,492,922 B1 * | 12/2002 | New | .................. | H03H 11/1291 341/120 |

(Continued)

OTHER PUBLICATIONS

Harvey Mudd College, Sampling Theorem, http://fourier.eng.hmc.edu/e102/lectures/samplingThm/node2.html, viewed on Jul. 13, 2016, 8 pages, USA.

(Continued)

*Primary Examiner* — Gregory J Tryder
*Assistant Examiner* — Jitesh Patel
(74) *Attorney, Agent, or Firm* — International IP Law Group, P.L.L.C.

(57) ABSTRACT

A method, graphics processing unit, and system are described herein. The method for adaptive anisotropic filtering includes calculating a number of ways of anisotropy based on a computed level of detail of a texture map and applying a bilinear low pass filter to a texture map's closest two MIP maps using a processor. An effective number of ways and filter sizes may be computed on each of the closest two closest MIP maps. Additionally, the closest two MIP maps may be sampled at their respective effective number of ways. The method also includes applying a corresponding sized low pass filters to each of the closest two MIP maps, and combining the filtered closest two MIP maps using a weighted sum based on a fractional part of a computed level of detail.

17 Claims, 9 Drawing Sheets

(56) References Cited

U.S. PATENT DOCUMENTS

| | | | | |
|---|---|---|---|---|
| 6,664,971 B1* | 12/2003 | Mukherjee | | G06T 15/04 345/582 |
| 6,674,430 B1* | 1/2004 | Kaufman | | G06T 15/005 345/419 |
| 7,372,468 B1* | 5/2008 | Toksvig | | G06T 15/04 345/582 |
| 7,619,635 B1* | 11/2009 | Toksvig | | G06T 15/04 345/582 |
| 7,773,092 B1* | 8/2010 | Heckbert | | G09G 5/393 345/582 |
| 2004/0119720 A1* | 6/2004 | Spangler | | G06T 15/04 345/583 |
| 2004/0257376 A1* | 12/2004 | Liao | | G06T 15/04 345/587 |
| 2005/0007379 A1* | 1/2005 | Vijayakumar | | G06T 11/001 345/582 |
| 2006/0119599 A1* | 6/2006 | Woodbury, Jr. | | G06T 15/04 345/420 |
| 2006/0250409 A1* | 11/2006 | Bando | | G06T 15/04 345/582 |
| 2007/0052718 A1* | 3/2007 | McKellar | | G06T 15/04 345/582 |
| 2009/0295821 A1* | 12/2009 | Mantor | | G09G 5/363 345/582 |
| 2010/0245374 A1* | 9/2010 | Iourcha | | G06T 15/04 345/586 |
| 2011/0134136 A1* | 6/2011 | Seiler | | G06T 5/002 345/582 |
| 2011/0176744 A1* | 7/2011 | Ko | | G06T 3/4007 382/264 |
| 2013/0021359 A1* | 1/2013 | Baker | | G06T 11/001 345/584 |

OTHER PUBLICATIONS

Heckbert, Paul S., Fundamentals of Texture Mapping and Image Warping, Master's Thesis for University of California Department of Electrical Engineering and Computer Science, Jun. 17, 1989, 94 pages, USA.

Mavridis et al., High Quality Elliptical Texture Filtering on GPU, http://www.pmavridis.com/data/I3D11_EllipticalFiltering.pdf, viewed on Jul. 13, 2016, 8 pages, USA.

Microsoft, Anisotropic Texture Filtering (Direct3D 9), http://msdn.microsoft.com/en-us/library/windows/desktop/bb172264(v=vs.85).aspx, viewed on Jul. 13, 2016, 1 page, USA.

Wikipedia, Fourier Analysis, retrieved Aug. 8, 2016, last modified Jul. 28, 2016, https://en.wikipedia.org/w/indesx.php?title=Fourier_analysis&oldid=732005301, 10 pages, USA.

Wikipedia, Nyquist-Shannon Sampling Theorem, retrieved Aug. 8, 2016, last modified Jul. 22, 2016, https://en.wikipedia.org/w/index.php?title=Nyquist-Shannon_sampling_theorem&oldid=731041727, 10 pages, USA.

Wikipedia, DFT Matrix, retrieved Aug. 8, 2016, last modified Jun. 28, 2016, https://en.wikipedia.org/w/index.php?title=DFT_matrix&oldid=727394286, 5 pages, USA.

Wikipedia, Dirac (Video Compression Format), retrieved Aug. 8, 2016, last modified Jul. 27, 2016, https://en.wikipedia.org/w/index.php?title=Dirac_(video_compression_format)&oldid=731854087, 5 pages, USA.

* cited by examiner

200

300

600

ADAPTIVE ANISOTROPIC FILTERING

BACKGROUND ART

In computer graphics, an object may be rendered by first rendering the geometry of the object, then applying a texture map to the object geometry. In some cases, the object includes polygons that form a mesh. The texture map may be applied to the polygonal mesh. The texels of the texture map may not have a one-to-one correspondence with the pixels of the computer screen. Accordingly, the texels may be sampled in order to determine the color of a pixel of the computer screen.

BRIEF DESCRIPTION OF THE DRAWINGS

The following detailed description may be better understood by referencing the accompanying drawings, which contain specific examples of numerous objects and features of the disclosed subject matter.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
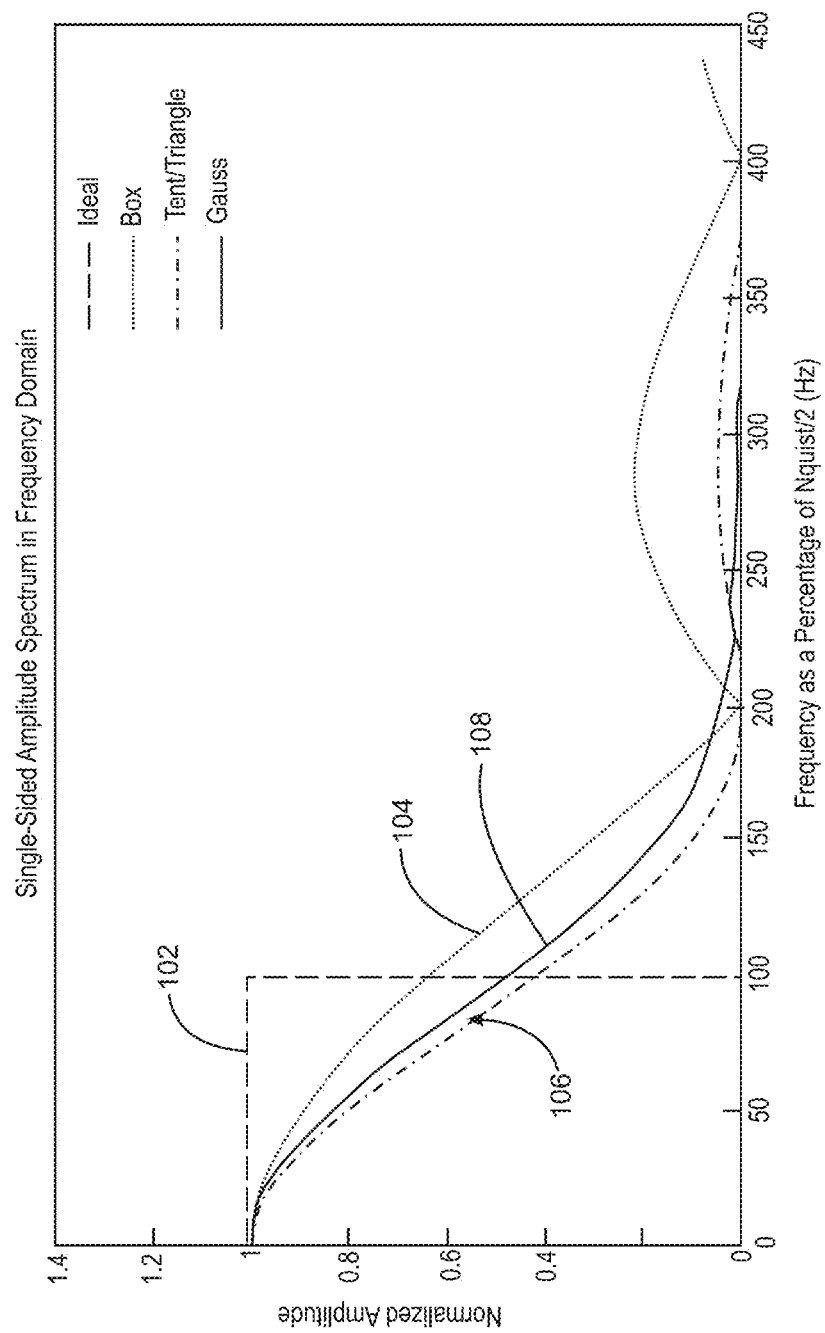
FIG. 1 is an illustration of common filter shapes in the frequency domain.

To compute a color value for a pixel of a computer screen, an area of the texture map is sampled. In some cases, the smallest unit of the texture map is known as a texel. The area of the texture map sampled is dependent upon the shape of the pixel, and may be known as a pixel footprint. For each pixel, the area sampled to compute the pixel color may change in shape and number of texels. In some cases, the number of texels sampled by each screen pixel is dependent upon the distance of each texture mapped polygon from the screen pixel, as well as the angle of each texture mapped polygon with respect to the screen pixel. The texels used to determine the color of each screen pixel may be filtered in order to improve the quality of the resulting image. Even when the sampled textures are filtered, the resulting image may include undesirable distortions and artifacts, also known as aliasing.

Aliasing may also be a result of the difference between the shape of the area sampled for each pixel and the shape of the filter. Filtering techniques such as bilinear filtering and trilinear filtering are isotropic in that both techniques sample the texture mapped polygon in a uniform fashion, where the shape of the area to be sampled is the same in all directions, or isotropic. In particular, bilinear filtering determines the color of the pixel by interpolating the closest four texels to the pixel center in an area of the texture mapped polygon sampled by the pixel. Trilinear filtering uses bilinear filtering on the two closest Multum in parvo (MIP) map levels, and then interpolates those results to determine the pixel color. MIP maps may be used to reduce aliasing and increase rendering speed. In some cases, the MIP maps are a set of images that represent the texture of an original, main image at a different level of detail (LOD) for each MIP map. Accordingly, each texture has several additional images at varying levels of detail. The additional images are used to generate a final image for rendering.

In anisotropic filtering, the texture map is sampled as a non-uniform shape. In some cases, the shape of the filter may correspond to the pixel footprint. Filter shapes used in anisotropic filtering include, but are not limited to, box filters, triangle filters, and Gaussian filters. In order to filter the samples from the texture map, the filters may be applied to the texture data. However, the selected filter shape may allow undesirable frequencies to pass, thus corrupting the filtered texture data. To prevent corruption of the filtered texture data, Microsoft® DirectX ® tends to adaptively filter texture data using a box filter with trilinear sample points. NVIDIA® may use a box filter with adaptive filter width on the MIPs. In this manner, the lower MIP's filter width is twice the higher MIP's filter width. Moreover, Intel® has used a box filter with bilinear samples on both MIPs. The same filter width is applied to both MIPs, such that the filter width is non-adaptive.

Embodiments described herein provide adaptive anisotropic filtering. In embodiments, a selected filter shape is adapted to each MIP map with varying LODs. The filter width may be adapted such that the filter is twice as wide on a first MIP map with a higher LOD when compared to the filter applied to a second MIP map with a lower LOD. In this manner, twice as many samples are obtained from the first MIP map when compared to the second MIP map. Further, in some embodiments, Gaussian filters with adaptive filter widths may be applied to the texture data. Additionally, in embodiments, MIP maps with lower resolutions may be used in imaging, in a trade-off with including more blur when compared to MIP maps with higher resolutions. Adaptive widths for the anisotropic filter, with bilinear filtering on each of the MIP map levels, results in retaining the filter shape for each of the MIP maps. Adapting the filter shape has a direct impact on the moire observed at the Nyquist/Sampling frequencies and multiples of the Nyquist/Sampling frequencies. For descriptive purposes, the selected filter shape is Gaussian, however any other filter shape may be used. In particular, any other filter shape may be used that minimizes aliasing for a low-pass filter-length that spans the length of two samples, such as a triangle filter. Moreover, instead of bilinear filtering, other filters may be used for the initial sampling of the MIP maps, although this may be against imaging standards.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is an illustration 100 of common filter shapes in the frequency domain. When the data representing an image is sampled, frequencies are replicated around each multiple of the sampling frequency of the data. The replicated frequencies can be considered noise in the image data. An ideal low pass filter is illustrated at reference number 102. When used to filter image data, the ideal low pass filter can attenuate the replicated frequencies that occur beyond a cut-off frequency.

By attenuating the frequencies in the image data that occur beyond the cut-off frequency, the replicated frequencies do not contribute noise to the sampled image data. For example, assume an image where the cut-off frequency of the image data is 50 Hz. The ideal low pass filter 102 can be used to filter image data that may then be sampled at 100 Hz to ensure complete reconstruction of the image data according to the Nyquist Shannon Sampling Theorem. According to the Nyquist Shannon sampling theorem, a sampling frequency of at least twice the cut-off frequency will avoid aliasing when the image data is reconstructed. The ideal low pass filter 102 can attenuate the image data at 50 Hz and filter out all frequencies beyond 50 Hz in the image data. In this manner, the ideal low pass filter 102 can remove all frequencies that may corrupt the selected sampling interval.

A box filter 104, triangle filter 106, and a Gaussian filter 108 are each represented in FIG. 1. Each of the box filter 104, triangle filter 106, and Gaussian filter 108 are considered as non-ideal. As illustrated, each of the box filter 104, triangle filter 106, and Gaussian filter 108 will enable frequencies beyond the ideal cut-off frequency to pass. Thus, in examples, for the image data that is sampled at 100 Hz, each of the non-ideal filters allows the replicated image data beyond the cut-off frequency of the ideal low pass sinc filter 102 to pass. This assumes that the time-domain lengths of each of the ideal low pass sinc filter 102, the triangle filter 106, and the Gaussian filter 108 are equal to two samples' length interval of sampling. For the box-filter 104, this example assumes that the time-domain length is one sample length interval of sampling. In some cases, the length of a filter refers to the number of samples taken by each filter. These assumptions are made in light of the corresponding Fourier transforms' low-pass bands of each filter as explained in Heckbert's Thesis of 1989.

The Nyquist-Shannon sampling theorem as explained in Heckbert's Thesis of 1989 describes the Nyquist frequency Nq as the frequency at which a function may be completely reconstructed from a set of samples. When images are filtered by a non-ideal filter and then sampled at the ideal sinc filter's Nyquist frequency, the portions of the image beyond $$\frac{Nq}{2}$$

result in aliasing with the frequencies below $$\frac{Nq}{2},$$

where Nq is the Nyquist/Sampling frequency of ideal sinc filter. The aliasing is a result of the replicated frequencies of the image data being passed due to the non-ideal filter. Consequently, when filtered image is sampled, the replicated frequencies will extend their frequencies from beyond $$\frac{Nq}{2}$$

into the 0 to $$\frac{Nq}{2}$$

frequency range, thereby adding noise to the 0 to $$\frac{Nq}{2}$$

frequency range.

Table 1 includes the signal to noise ratio (SNR) for common filter shapes, including the sinc and Gaussian filters as discussed above:

TABLE 1

| Filter | Signal-to-Noise Ratio |
|---|---|
| Sinc | 31.8 |
| Box | 0.88 |
| Triangle/Tent | 3.41 |
| Gauss | 3.15 |

While the triangle filter has a better SNR than the Gaussian filter, the triangle also enables non-zero frequencies to pass at frequency multiples that are approximately 1.5*Nq. The Gaussian filter enables non-zero frequencies to pass at approximate multiples of Nq. As a result, either of these filters may be used, while paying attention to the effects of these two frequency points, 1.5*Nq and Nq, as explained below. While an actual ideal sinc filter has an infinite SNR, the above figure of 31.8 is a result of approximating this filter with 160-tap points in Matlab®.

Figure 2:
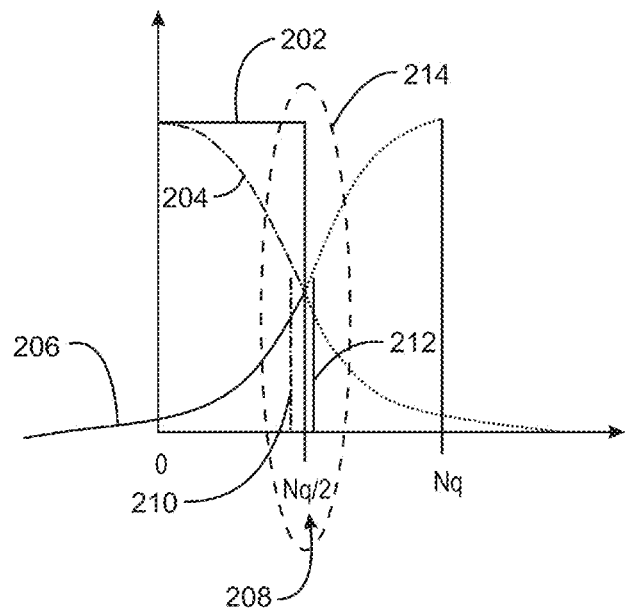
FIG. 2 is a graph and image that illustrates blistering resulting from frequencies in the parent signal that are odd multiples of half the Nyquist/Sampling frequency.
Figure 2:
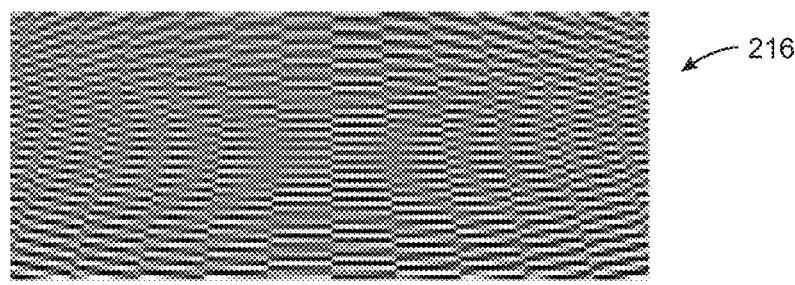

As noted above, undesired frequencies are those frequencies above $$\frac{Nq}{2}$$

of the image data before anisotropic filtering. The undesired frequencies should be removed as they cause subsequent aliasing. FIG. 2 is a graph 200 and image 216 that illustrates blistering resulting from frequency mixing near odd multiples of $$\frac{Nq}{2}.$$

An ideal sinc filter is illustrated at reference number 202. A Gaussian filter is illustrated at reference number 204. The image/texture map data is illustrated by the frequency at reference number 210. As illustrated, the frequency at reference number 210 illustrating the image/texture data is filtered by the Gaussian filter 204 such that any image/texture data beyond the Gaussian filter 204 is not passed.

The image/texture map data 210 is sampled after filtering, and the sampled data has a replicated frequency with Nq as the center that aliases around $$\frac{Nq}{2},$$

as illustrated by the frequency component at reference number 212. This particular effect occurs for frequencies around exactly $$\frac{Nq}{2}$$

and is unavoidable. At reference number 206, a replicated counterpart of the Gaussian filter 204 is illustrated. The replicated counterpart 206 filters the aliased frequency component at reference number 212. Even if the ideal sinc filter 202 is used for filtering, the frequency of the image data at 210 will be replicated on to the frequency at reference number 212 after sampling the filtered image. To minimize this frequency mixing, one can choose a narrower low-pass filter, but that will result in undue blur. The noise around $$\frac{Nq}{2}$$

cannot be removed without compromising on blur. However, in the case of further odd multiples of $$\frac{Nq}{2},$$

any of the ideal, Gaussian and triangle filters do attenuate the image/texture data such that those frequencies are not passed through the filter and do not affect the sampled data. Overall, the Gaussian filter gives a good trade-off for finite impulse response (FIR) filters when compared with the filter shape of, for example, the box filter which passes far more undesired frequencies as summarized through Table 1 and FIG. 1.

For exemplary purposes, assume the image/texture data cut-off frequency at reference number 210 is 48 Hz. Additionally, for example, assume the image data is eventually sampled with a frequency of 100 Hz. When a frequency close to 50 Hz, such as this 48 Hz, is sampled with a frequency of 100 Hz, then a source cosine(50−2)Hz at reference number 210 obtains a neighbor cosine (50+2) Hz at reference number 212 from the neighboring lobe of the image data with a reverse phase as shown within the dashed circle at reference number 214. This is a cross-mixing of frequencies of neighboring lobes of the image/texture data in the frequency domain. The frequencies of close magnitude results in modulated frequencies. Specifically, in this example, cosine(50−2)+cosine(50+2)=2*cosine(2)*cosine (50), which results in a 50 Hz wave modulated by a 2 Hz wave. This low frequency modulation of the $$\frac{Nq}{2}$$

frequency from the original 48 Hz appears as a blister in the rendered image, as illustrated at reference number 216. Specifically, the blistering effects in the rendered image at reference number 216 are the patterns that occur in the image other than the standard checkerboard pattern that should be rendered.

Figure 3:
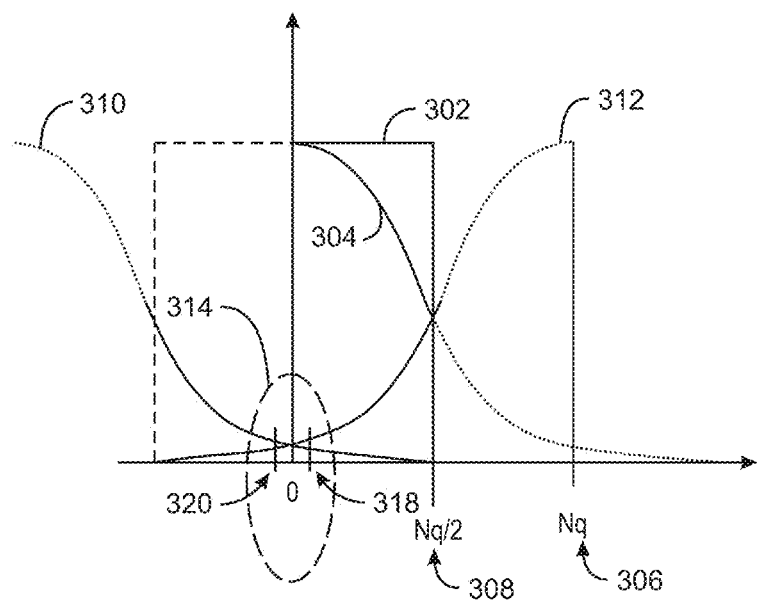
FIG. 3 is a graph and an image that illustrates blistering resulting from frequencies in the parent signal that are multiples of the Nyquist/Sampling frequency.
Figure 3:
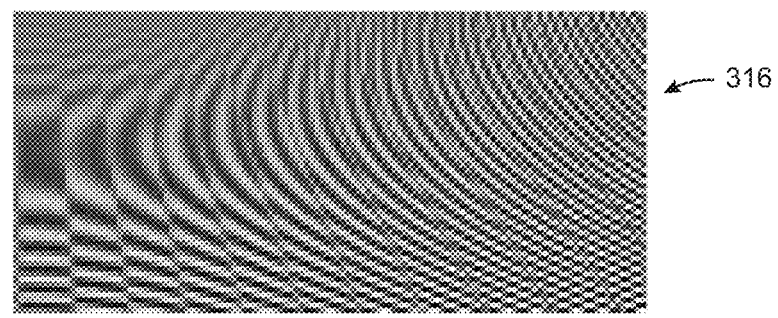

FIG. 3 is a graph 300 and an image that illustrates blistering resulting from frequencies as multiples of the Nyquist frequency. An ideal sinc filter is illustrated at reference number 302. A Gaussian filter is illustrated at reference number 304. The image/texture map is close to Nq. When the image/texture map is sampled after filtering, the sampled data has its next replicated frequency with Nq as the center has a component near 0 Hz. The replicated frequencies are illustrated near 0 Hz within the oval at reference number 314. Accordingly, the replicated frequencies occur near the center point of the first lobe. Moreover, the Gaussian filter at reference number 304 effectively includes a lobe 310, and a lobe 312 as a result of the sampling process. If the ideal sync filter at reference number 302 is used, it will filter out all frequencies beyond $$\frac{Nq}{2},$$

including these replicated frequencies. However, any FIR filter, including the Gaussian filter at reference number 304 will enable a reduced amplitude version of this replicated frequency to pass. Specifically, the amplitude of the frequencies at reference numbers 318 and 320 are reduced in amplitude by the replicated portions of the Gaussian filter 304 indicated by reference numbers 310 and 312. However, as noted above, with regard to FIG. 2, the Gaussian filter is a good trade-off for FIR filters when compared with other filter shapes. For example, a box filter passes far more undesired frequencies, as summarized through Table 1 and FIG. 1.

For exemplary purposes, assume the image frequency is 98 Hz. Additionally, assume the image data is sampled at a frequency of 100 Hz. A neighboring replicated 98 Hz frequency from the lobe at reference number 312 ends up an area close to 0 Hz as shown at reference number 318 within the oval at reference number 314. Similarly, the other neighboring lobe 310 introduces another replicated frequency at reference number 320. Accordingly, the cross-mixing of frequencies comes from both neighboring lobes of the image data at reference numbers 310 and 312. This has the effect of creating a 2 Hz low frequency signal, thus appears in the rendered image a blister, as illustrated at reference number 316. These aliased frequencies near 0 Hz are the prime ones which appear bad to our eye.

Trilinear and anisotropic filtering may be performed on the sampled image/texture data based off the nearest two MIP maps at two different LODs to a computed LOD. In examples, the two nearest MIP maps may be named LOD and LOD_p1. The first MIP map, LOD, is a lower numbered MIP map with a larger texture map with a higher level of detail when compared to the computed LOD. The second MIP map, LOD_p1, is a higher numbered MIP map with a smaller texture map with a lower level of detail when compared to the computed LOD. For further analysis, the desired sampled LOD is taken as the mid-point of these, defined as LOD_pt5. Accordingly, the desired sampled LOD is in-between LOD and LOD_p1. In embodiments, the Fourier Transform (FT) widths of each MIP map increases as the level of detail of the MIP map increases because the time domain is halved for each progressive LOD. For example, a 50 Hz sine wave on the first LOD will appear as a 100 Hz sine wave on LOD_p1. However, when these LODs are normalized to any one time scale, say LOD_pt5's time scale, they will both approximately appear as a 75 Hz sine wave.

Figure 4:
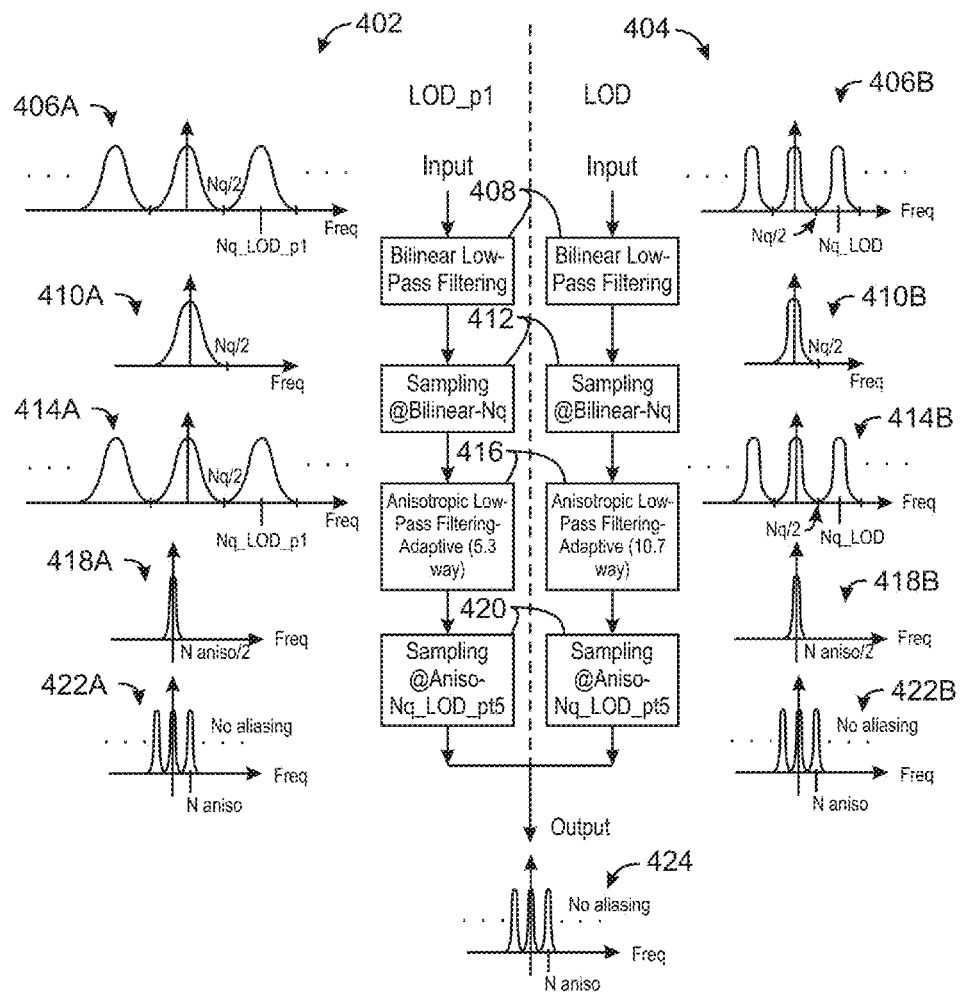
FIG. 4 is a diagram illustrating adaptive anisotropic filtering.

FIG. 4 is a diagram 400 illustrating adaptive anisotropic filtering. In some embodiments, an adaptive width Gaussian filter is used to filter the sampled image data. The adaptive filter widths can be applied to the two MIP maps closest to the LOD of the texture map to be sampled, such as LOD and LOD_p1. In FIG. 4, anisotropic filtering is described where the number of ways of anisotropy is eight. However, the ways of anisotropy is twice the ratio of the major length/axis versus the minor length/axis. Accordingly, the number of ways of anisotropy is twice the ratio of anisotropy. This difference is key and is based on having the low-pass filter form as explained in FIG. 1. The computed LOD is assumed to be exactly between two MIP maps, for example x.5, where x is an integer. While this is done for purposes of illustration, the present techniques can be used with any LOD or way/tap value.

To the right of dashed line in FIG. 4, adaptive Gaussian anisotropic filtering on the LOD 404 is illustrated. Similarly, to the left of the dashed line in FIG. 4, adaptive Gaussian anisotropic filtering on the LOD_p1 402 is illustrated. The LOD 404 represents a MIP map with a larger texture map. The LOD_p1 402 represents an LOD that is one level higher than the LOD 404, with a smaller texture map. A graph 406A represents the assumed Fourier transform of the texture at the LOD_p1 402. A graph 406B represents the corresponding Fourier transform of the texture at the LOD 404. The number of ways of anisotropy, can be calculated from the incoming pixels. The number of samples taken for this is the closest larger even number than the ways of anisotropy.

At block 408, bilinear filtering is applied to each texture map of the LOD 404 and the LOD_p1 402. The filtered source texture is illustrated by graph 410A and graph 410B. At block 412, the filtered texture is sampled with a sampling interval of 1-texel. Aliasing may be avoided when sampling at block 412 by continuing to use 1-texel interval sampling. Each of graph 414A and graph 414B illustrate the results of bilinear filtering and sampling for the LOD 404 and the LOD_p1 402, respectively.

At block 416, anisotropic low pass filtering is performed on each of the LOD 404 and the LOD_p1 402. The anisotropic filtering may be performed by first computing the effective number of ways or samples to be obtained from the bilinear samples. This is done by computing an anisotropic ratio on each MIP map from an original anisotropic ratio by multiplying by power of two of the fractional LOD for the lower MIP, and dividing by this number for the higher MIP map. In this manner, the original anisotropic filter shape is retained. The anisotropic ratio is the ratio of the major axis of the pixel footprint and the minor axis of the pixel footprint. The width of the anisotropic filter may determine the number of ways/bilinear samples to be obtained when determining the effective number of ways for each of the two closest MIP maps. In some cases, the width of the anisotropic filter may be twice the anisotropic ratio, and is used to determine the number of bilinear samples to be obtained. In an example where the number of ways of anisotropy is eight at an LOD of x.5, the effective number of ways to be obtained from the bilinear samples is $8 \times 2^{0.5}$ ways on LOD x.0 at reference number 404, and $$\frac{8}{2^{0.5}}$$

ways on LOD (x+1).0 at reference number 402. This results in an adaptive filter width, as it is calculated based on the number of ways at the respective LODs. Accordingly, the filters are adaptively sized for each MIP map. When the resulting LODs are normalized to any one time scale, they will both have the same anisotropic Nyquist frequency. As a result, aliasing does not occur at LOD x.0 and blurring does not occur at LOD (x+1).0. Aliasing is avoided here by selecting a filter width that retains the original filter width as seen on LOD x.5. While noise may be introduced by the anisotropic low-pass filtering due to the bilinear/tent/triangle filtering discussed above, the noise is not concerning as bilinear filtering on each MIP is mandated by several standards, such as Direct X or OpenGL.

A graph 418A illustrates the LOD_p1 at reference number 402 after being filtered by the adaptive Gaussian anisotropic filter. Similarly, a graph 418B illustrates the LOD at reference number 404 after being filtered by the adaptive Gaussian anisotropic filter. At block 420, each of the LOD and the LOD_p1 are sampled at the anisotropic Nyquist frequency. The results of the anisotropic sampling are combined as a weighted sum based on the fractional part of the computed LOD, resulting in a signal with no aliasing as illustrated by the graph at reference number 424. In some cases, the fractional part of the computed LOD is any fractional values as compared to the computed LOD. Accordingly, the weight applied to each given LOD is inversely proportional to the fractional difference between the computed LOD and the given. In some cases, when the computed LOD is assumed to be exactly between two MIP maps, for example x.5, where x is an integer, the fractional part indicates the LOD exactly between the two MIP maps. Moreover, consider the example where the computed LOD is 4.1. A weight of 0.9 is applied to LOD4, while a weight of 0.1 is applied to LOD5. The two weighted LODs are then summed.

Additionally, as used herein, "no aliasing" can indicate no more aliasing than compared to a standard Gaussian filter. Moreover, "no aliasing" can indicate similar signal-to-noise ratios as a standard Gaussian filter. In embodiments, the Gaussian filter is scaled for each MIP map at a different LOD such that the number of samples taken from each MIP map remains the same across all MIP maps. Accordingly, the sampling rate for an anisotropic filter may be adapted as the LOD changes across MIP maps. In particular, the sampling rate may be reduced as the LOD increases. As a result, the higher frequencies of the image may be attenuated, even with a lower number of samples.

Figure 5:
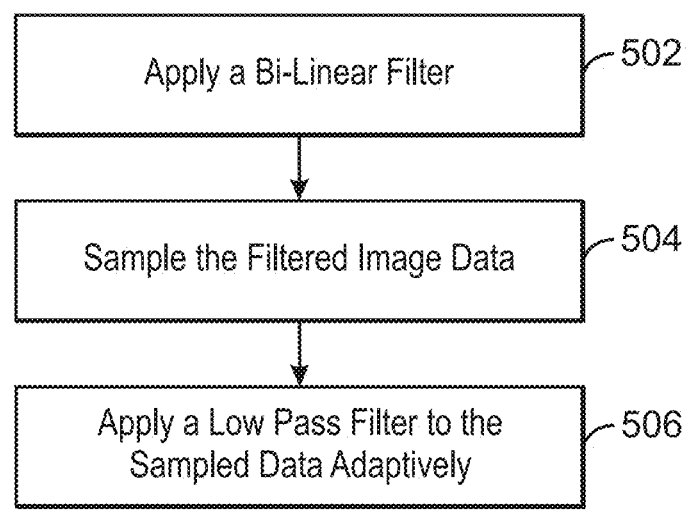
FIG. 5 is a process flow diagram of a method for adaptive anisotropic filtering.

FIG. 5 is a process flow diagram 500 of a method for adaptive anisotropic filtering. At block 502, a bilinear low pass filter may be applied to image data using a processor. Specifically, bilinear filtering may be used to interpolate values from texels of a texture map to determine a pixel color. At block 504, the filtered image data may be sampled. In some cases, the number of samples is calculated by multiplying by a power of two of the fractional LOD for a lower MIP map. Further, the number of samples may be calculated by dividing by a power of two of the fractional LOD for a higher MIP map. Additionally, at block 506, a low pass filter may be applied to the sampled data adaptively based on the level of detail of the image data. Moreover, in some cases, both a higher MIP map and a lower MIP map can be processed simultaneously, as described by reference numbers 502, 504, and 506. The results of each MIP map may then be combined as a weighted sum based on the fractional part.

Figure 6:
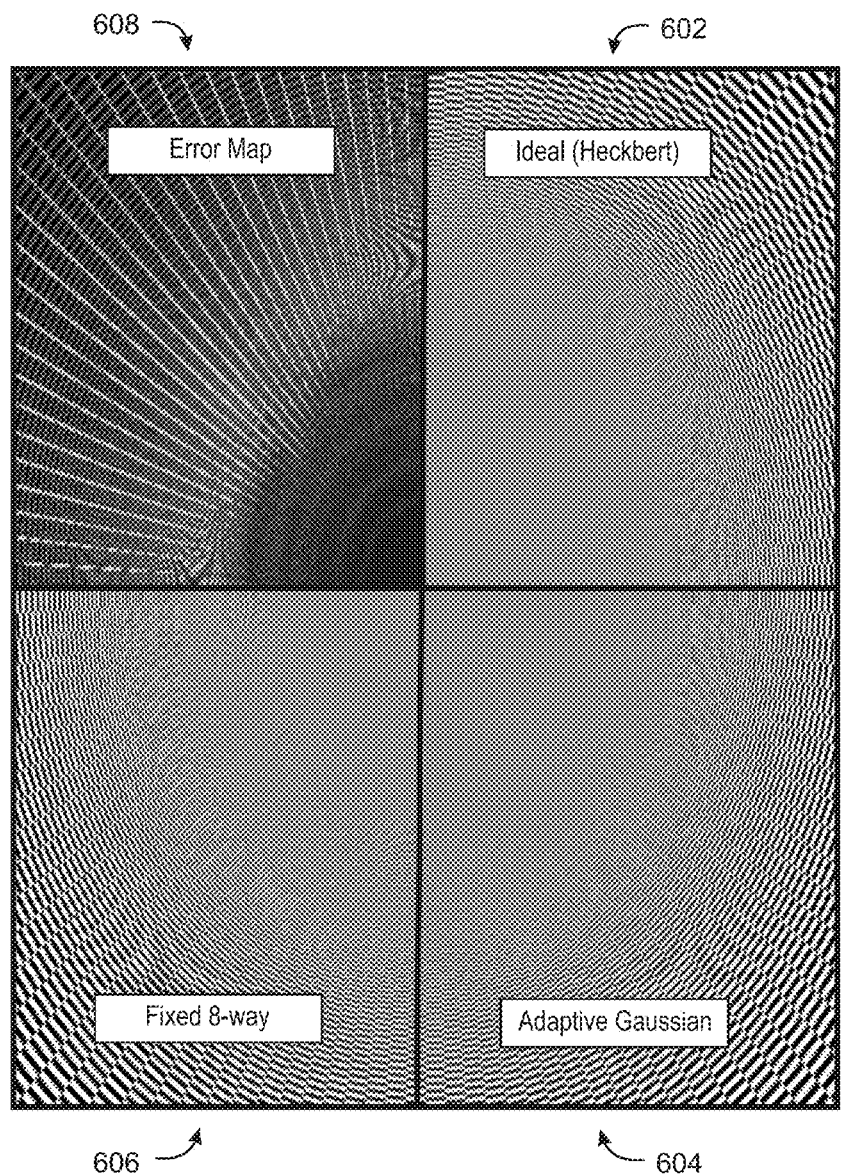
FIG. 6 is an example of an image rendered using various filtering techniques and the error of the adaptive filtering against ideal Heckbert sampling.

FIG. 6 is an example of an image 600 rendered using various filtering techniques. To create the image 600, the texture map used is a 4096×4096 checker-board map with each black/white square being a 32×32 texels in size. The output image is an 800×640 image box. The box was selected at a non-uniform size in order to illustrate aliasing effects. The image 600 is shaped as a tunnel going to infinity. Such a shape is selected in order to check anisotropic filtering. The image 600 is viewed from a perspective of standing in the center of the tunnel. The distance and zoom of the image 600 is selected to illustrate aliasing effects mostly around 8-way anisotropy.

The image 600 is divided into four quadrants, each quadrant produced using the same computing system. A quadrant 602 is the result of an ideal filter according to Heckbert's MS thesis of 1989, including the Nyquist/Shannon sampling theorem. A quadrant 604 is the result of adaptive Gaussian filtering as described in FIG. 4. A quadrant 606 is the result of Box filtering using anisotropic filtering fixed at eight ways/taps for both MIPs. The quadrant 608 is an error map between quadrants 602 and 604. The quadrant 608 is formed by differencing the images in quadrants 602 and 604, and multiplying the error intensity by a factor of sixteen to illustrate the error between the specific filtering methods.

The image in quadrant 604 filtered using the adaptive Gaussian filter is a close match to the image in quadrant 602 filtered using the ideal filter described by Heckbert fairly closely. Specifically, the two blistering effects of the image in quadrant 604 are down to a level where they match the image in quadrant 602. Further, the error map in quadrant 608 shows very little error. In embodiments, any error and moire can further be improved by adjusting an angle computation. Such angle computations may be found in Heckbert's MS thesis of 1989.

In embodiments, when performing adaptive Gaussian filtering as described with respect to FIGS. 4 and 5, a next higher MIP map pair may be selected by incrementing the computed LOD by one MIP map level. In other words, adaptive Gaussian filtering may be accomplished for a computed LOD by choosing LODs (x+1).0 and (x+2).0 instead of LODs x.0 and (x+1).0 as described above. By selecting the next higher MIP map pair, the total number of taps on the MIP maps of the next high pair is similar to filtering using a box-filter on the original computed LOD. This is because the number of taps are halved for each higher MIP map used. Since a Gaussian filter, such as the Gaussian filter in FIG. 1, would otherwise have been two sample widths wide on the original computed LOD, the width would be half that number when the computed LOD is incremented by one MIP map level. This ends up matching the single sample width of a box filter of FIG. 1 on the original computed LOD. This approach remains adaptive due to the different number of taps on different MIP maps. When choosing the next higher MIP map pair, if the LOD was x.0, it is made (x+1).0 and the filter width on both the MIP maps is halved. The next highest MIP map pair results in a largely an equivalent filter shape and width for the major-axis, which is the direction of anisotropy. However, it may create blur for the minor axis. In some cases, the minor axis is a bilinear filter, which may be a tent/triangle filter with properties stated in with respect to FIG. 1, with a cut-off frequency of $$\frac{Nq}{2}$$

and aliasing with tails extending beyond Nq frequency. As a result, when going to the next higher MIP map pair, the filter-width of the major-axis may be reduced, however the filter-width of the minor-axis is not reduced due to the bilinear filtering. Consequently, when translated to the original MIP-pair of x.0, the filter width appears as a double-width tent/triangle filter with respect to the adaptive Gaussian filter. This results in additional blur when compared to adaptive Gaussian filtering.

Figure 7:
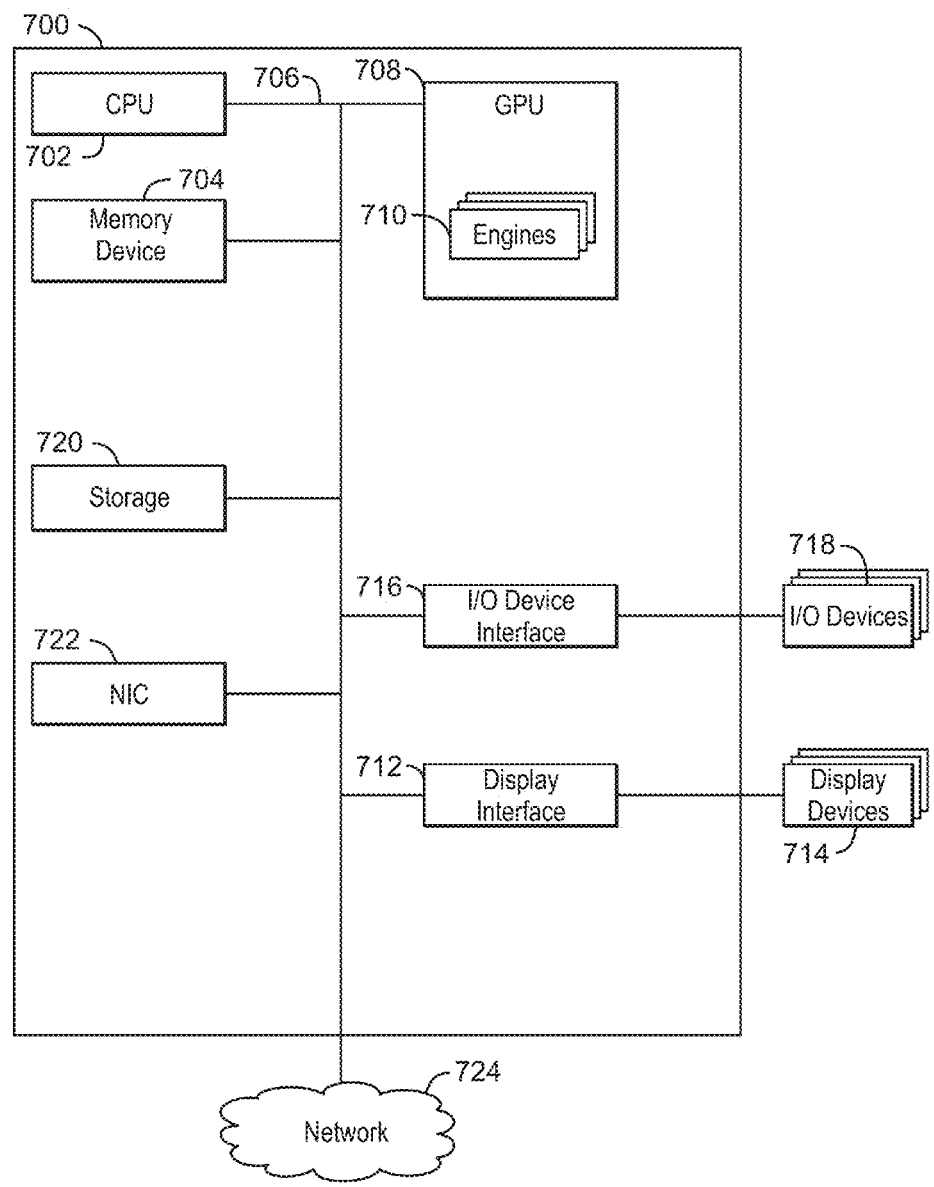
FIG. 7 is a block diagram of a computing device that may execute adaptive anisotropic filtering.

FIG. 7 is a block diagram of a computing device 700 that may execute adaptive anisotropic filtering. The computing device 700 may be, for example, a laptop computer, desktop computer, ultrabook, tablet computer, mobile device, or server, among others. The computing device 700 may include a central processing unit (CPU) 702 that is configured to execute stored instructions, as well as a memory device 704 that stores instructions that are executable by the CPU 702. The CPU may be coupled to the memory device 704 by a bus 706. Additionally, the CPU 702 can be a single core processor, a multi-core processor, a computing cluster, or any number of other configurations. Furthermore, the computing device 700 may include more than one CPU 702.

The computing device 700 may also include a graphics processing unit (GPU) 708. As shown, the CPU 702 may be coupled through the bus 706 to the GPU 708. The GPU 708 may be configured to perform any number of graphics operations within the computing device 700. For example, the GPU 708 may be configured to render or manipulate graphics images, graphics frames, videos, or the like, to be displayed to a user of the computing device 700. The GPU 708 includes plurality of engines 710. In embodiments, the engines 710 may be used to perform adaptive Gaussian anisotropic filtering.

The memory device 704 can include random access memory (RAM), read only memory (ROM), flash memory, or any other suitable memory systems. For example, the memory device 704 may include dynamic random access memory (DRAM). The CPU 702 may be linked through the bus 706 to a display interface 712 configured to connect the computing device 700 to a display device 714. The display device 714 may include a display screen that is a built-in component of the computing device 700. The display device 714 may also include a computer monitor, television, or projector, among others, that is externally connected to the computing device 700.

The CPU 702 may also be connected through the bus 706 to an input/output (I/O) device interface 716 configured to connect the computing device 700 to one or more I/O devices 718. The I/O devices 718 may include, for example, a keyboard and a pointing device, wherein the pointing device may include a touchpad or a touchscreen, among others. The I/O devices 718 may be built-in components of the computing device 700, or may be devices that are externally connected to the computing device 700.

The computing device also includes a storage device 720. The storage device 720 is a physical memory such as a hard drive, an optical drive, a thumbdrive, an array of drives, or any combinations thereof. The storage device 720 may also include remote storage drives. The computing device 700 may also include a network interface controller (NIC) 722 may be configured to connect the computing device 700 through the bus 706 to a network 724. The network 724 may be a wide area network (WAN), local area network (LAN), or the Internet, among others.

The block diagram of FIG. 7 is not intended to indicate that the computing device 700 is to include all of the components shown in FIG. 7. Further, the computing device 700 may include any number of additional components not shown in FIG. 7, depending on the details of the specific implementation.

Figure 8:
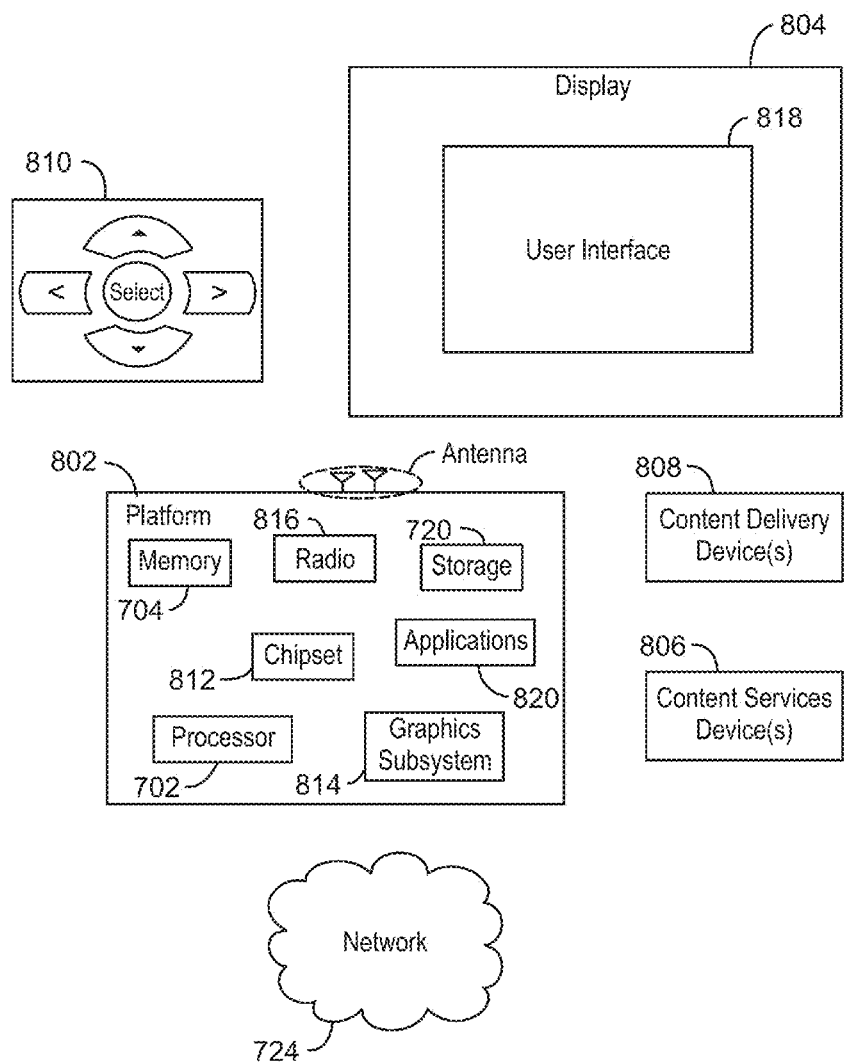
FIG. 8 is a block diagram of an exemplary system that executes adaptive Gaussian anisotropic filtering.

FIG. 8 is a block diagram of an exemplary system 800 that executes adaptive Gaussian anisotropic filtering. Like numbered items are as described with respect to FIG. 7. In some embodiments, the system 800 is a media system. In addition, the system 800 may be incorporated into a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, a printing device, an embedded device or the like.

In various embodiments, the system 800 comprises a platform 802 coupled to a display 804. The platform 802 may receive content from a content device, such as content services device(s) 806 or content delivery device(s) 808, or other similar content sources. A navigation controller 810 including one or more navigation features may be used to interact with, for example, the platform 802 and/or the display 804. Each of these components is described in more detail below.

The platform 802 may include any combination of a chipset 812, a central processing unit (CPU) 702, a memory device 704, a storage device 720, a graphics subsystem 814, applications 820, and a radio 816. The chipset 812 may provide intercommunication among the CPU 702, the memory device 704, the storage device 720, the graphics subsystem 814, the applications 820, and the radio 816. For example, the chipset 812 may include a storage adapter (not shown) capable of providing intercommunication with the storage device 720.

The CPU 702 may be implemented as Complex Instruction Set Computer (CISC) or Reduced Instruction Set Computer (RISC) processors, x86 instruction set compatible processors, multi-core, or any other microprocessor or central processing unit (CPU). In some embodiments, the CPU 702 includes multi-core processor(s), multi-core mobile processor(s), or the like. The memory device 704 may be implemented as a volatile memory device such as, but not limited to, a Random Access Memory (RAM), Dynamic Random Access Memory (DRAM), or Static RAM (SRAM). The storage device 720 may be implemented as a non-volatile storage device such as, but not limited to, a magnetic disk drive, optical disk drive, tape drive, solid state drive, an internal storage device, an attached storage device, flash memory, battery backed-up SDRAM (synchronous DRAM), and/or a network accessible storage device. In some embodiments, the storage device 720 includes technology to increase the storage performance enhanced protection for valuable digital media when multiple hard drives are included, for example.

The graphics subsystem 814 may perform processing of images such as still or video for display. The graphics subsystem 814 may include a graphics processing unit (GPU), such as the GPU 708, or a visual processing unit (VPU), for example. An analog or digital interface may be used to communicatively couple the graphics subsystem 814 and the display 804. For example, the interface may be any of a High-Definition Multimedia Interface, DisplayPort, wireless HDMI, and/or wireless HD compliant techniques. The graphics subsystem 814 may be integrated into the CPU 702 or the chipset 812. Alternatively, the graphics subsystem 814 may be a stand-alone card communicatively coupled to the chipset 812.

The graphics and/or video processing techniques described herein may be implemented in various hardware architectures. For example, graphics and/or video functionality may be integrated within the chipset 812. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

The radio 816 may include one or more radios capable of transmitting and receiving signals using various suitable wireless communications techniques. Such techniques may involve communications across one or more wireless networks. Exemplary wireless networks include wireless local area networks (WLANs), wireless personal area networks (WPANs), wireless metropolitan area network (WMANs), cellular networks, satellite networks, or the like. In communicating across such networks, the radio 816 may operate in accordance with one or more applicable standards in any version.

The display 804 may include any television type monitor or display. For example, the display 804 may include a computer display screen, touch screen display, video monitor, television, or the like. The display 804 may be digital and/or analog. In some embodiments, the display 804 is a holographic display. Also, the display 804 may be a transparent surface that may receive a visual projection. Such projections may convey various forms of information, images, objects, or the like. For example, such projections may be a visual overlay for a mobile augmented reality (MAR) application. Under the control of one or more applications 820, the platform 802 may display a user interface 818 on the display 804.

The content services device(s) 806 may be hosted by any national, international, or independent service and, thus, may be accessible to the platform 802 via the Internet, for example. The content services device(s) 806 may be coupled to the platform 802 and/or to the display 804. The platform 802 and/or the content services device(s) 806 may be coupled to a network 724 to communicate (e.g., send and/or receive) media information to and from the network 724. The content delivery device(s) 808 also may be coupled to the platform 802 and/or to the display 804.

The content services device(s) 806 may include a cable television box, personal computer, network, telephone, or Internet-enabled device capable of delivering digital information. In addition, the content services device(s) 806 may include any other similar devices capable of unidirectionally or bidirectionally communicating content between content providers and the platform 802 or the display 804, via the network 724 or directly. It will be appreciated that the content may be communicated unidirectionally and/or bidirectionally to and from any one of the components in the system 800 and a content provider via the network 724. Examples of content may include any media information including, for example, video, music, medical and gaming information, and so forth.

The content services device(s) 806 may receive content such as cable television programming including media information, digital information, or other content. Examples of content providers may include any cable or satellite television or radio or Internet content providers, among others.

In some embodiments, the platform 802 receives control signals from the navigation controller 810, which includes one or more navigation features. The navigation features of the navigation controller 810 may be used to interact with the user interface 818, for example. The navigation controller 810 may be a pointing device or a touchscreen device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures. Physical gestures include but are not limited to facial expressions, facial movements, movement of various limbs, body movements, body language or any combinations thereof. Such physical gestures can be recognized and translated into commands or instructions.

Movements of the navigation features of the navigation controller 810 may be echoed on the display 804 by movements of a pointer, cursor, focus ring, or other visual indicators displayed on the display 804. For example, under the control of the applications 820, the navigation features located on the navigation controller 810 may be mapped to virtual navigation features displayed on the user interface 818. In some embodiments, the navigation controller 810 may not be a separate component but, rather, may be integrated into the platform 802 and/or the display 804.

The system 800 may include drivers (not shown) that include technology to enable users to instantly turn on and off the platform 802 with the touch of a button after initial boot-up, when enabled, for example. Program logic may allow the platform 802 to stream content to media adaptors or other content services device(s) 806 or content delivery device(s) 808 when the platform is turned "off." In addition, the chipset 812 may include hardware and/or software support for surround sound audio and/or high definition surround sound audio, for example. The drivers may include a graphics driver for integrated graphics platforms. In some embodiments, the graphics driver includes a peripheral component interconnect express (PCIe) graphics card.

In various embodiments, any one or more of the components shown in the system 800 may be integrated. For example, the platform 802 and the content services device(s) 806 may be integrated; the platform 802 and the content delivery device(s) 808 may be integrated; or the platform 802, the content services device(s) 806, and the content delivery device(s) 808 may be integrated. In some embodiments, the platform 802 and the display 804 are an integrated unit. The display 804 and the content service device(s) 806 may be integrated, or the display 804 and the content delivery device(s) 808 may be integrated, for example.

The system 800 may be implemented as a wireless system or a wired system. When implemented as a wireless system, the system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum. When implemented as a wired system, the system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, or the like. Examples of wired communications media may include a wire, cable, metal leads, printed circuit board (PCB), backplane, switch fabric, semiconductor material, twisted-pair wire, co-axial cable, fiber optics, or the like.

The platform 802 may establish one or more logical or physical channels to communicate information. The information may include media information and control information. Media information may refer to any data representing content meant for a user. Examples of content may include, for example, data from a voice conversation, videoconference, streaming video, electronic mail (email) message, voice mail message, alphanumeric symbols, graphics, image, video, text, and the like. Data from a voice conversation may be, for example, speech information, silence periods, background noise, comfort noise, tones, and the like. Control information may refer to any data representing commands, instructions or control words meant for an automated system. For example, control information may be used to route media information through a system, or instruct a node to process the media information in a predetermined manner. The embodiments, however, are not limited to the elements or the context shown or described in FIG. 8.

Figure 9:
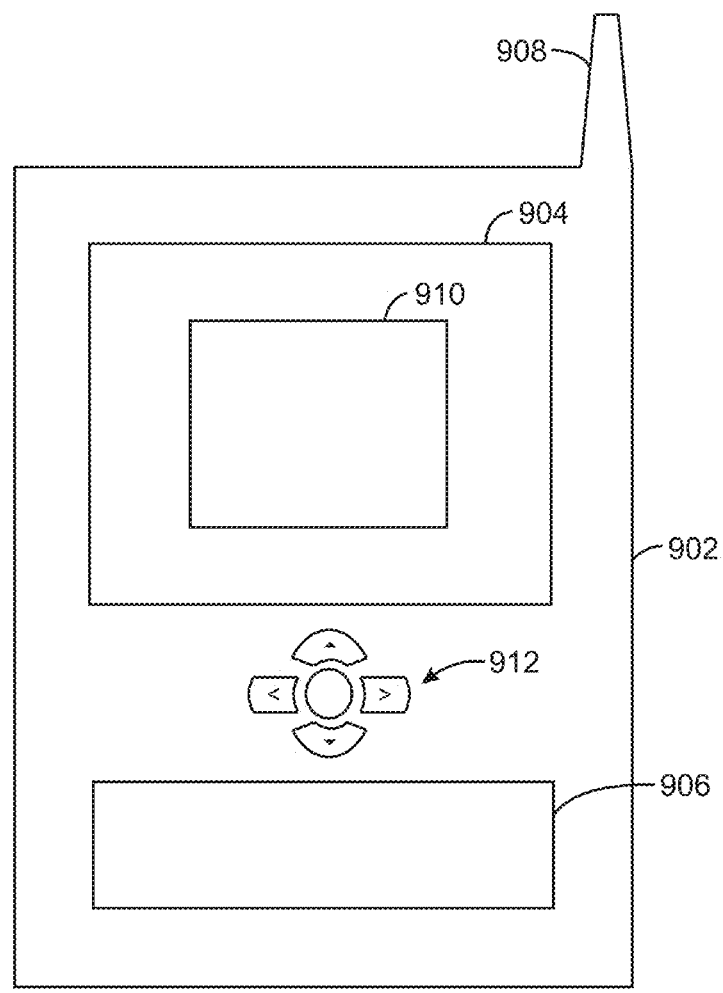
FIG. 9 is a schematic of a small form factor device in which the system of FIG. 8 may be embodied.

FIG. 9 is a schematic of a small form factor device 900 in which the system 800 of FIG. 8 may be embodied. Like numbered items are as described with respect to FIG. 8. In some embodiments, for example, the device 900 is implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, server computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and the like.

An example of a mobile computing device may also include a computer that is arranged to be worn by a person, such as a wrist computer, finger computer, ring computer, eyeglass computer, belt-clip computer, arm-band computer, shoe computer, clothing computer, or any other suitable type of wearable computer. For example, the mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wired or wireless mobile computing devices as well.

As shown in FIG. 9, the device 900 may include a housing 902, a display 904, an input/output (I/O) device 906, and an antenna 908. The device 900 may also include navigation features 912. The display 904 may include any suitable display 910 unit for displaying information appropriate for a mobile computing device. The I/O device 906 may include any suitable I/O device for entering information into a mobile computing device. For example, the I/O device 906 may include an alphanumeric keyboard, a numeric keypad, a touch pad, input keys, buttons, switches, rocker switches, microphones, speakers, a voice recognition device and software, or the like. Information may also be entered into the device 900 by way of microphone. Such information may be digitized by a voice recognition device.

EXAMPLE 1

A method for adaptive anisotropic filtering is described herein. The method includes calculating a number of ways of anisotropy based on a computed level of detail of a texture map and applying a bilinear low pass filter to a texture map's closest two MIP maps using a processor. The method also includes computing an effective number of ways and filter sizes on each of the closest two closest MIP maps and sampling the closest two MIP maps at their respective effective number of ways. Additionally, the method includes applying a corresponding sized low pass filters to each of the closest two MIP maps and combining the filtered closest two MIP maps using a weighted sum based on a fractional part of a computed level of detail.

The low pass filter shape may pass a minimum of higher frequency components beyond an ideal sampling cut-off frequency and a maximum of lower frequency components within the ideal sampling cut-off frequency. The signal filtered by the bilinear low pass filter may be sampled at a one-texel interval on each corresponding MIP map. Additionally, an adaptive anisotropic low pass filter may be enabled by first computing the number of bilinear samples to be obtained from each MIP map. The effective number of ways for each of the two closest MIP maps may be computed by first computing the anisotropic ratio on each MIP map from an original anisotropic ratio by multiplying by a power of two of the fractional LOD for a lower MIP map of the two closest MIP maps, and dividing for a higher MIP map of the two closest MIP maps. Moreover, a width of the anisotropic low pass filter for each of the two closest MIP maps may be twice the anisotropic ratio for each MIP map, and the width may determine the number of ways. The adaptive anisotropic filtering may be performed using a Gaussian filter, a triangle filter, or any filter that passes a minimum of higher frequency components beyond an ideal sampling cut-off frequency and a maximum of lower frequency components within the ideal sampling cut-off frequency.

EXAMPLE 2

A graphics processing unit is described herein. The graphics processing unit includes at least one bilinear low pass filter. The bilinear low pass filter is to filter data for a first MIP map and a second MIP map, and data from each MIP map represents a two by two group of texels, and wherein the two by two group of texels is nearest to a desired position on the first MIP map and the second MIP map, respectively. The graphics processing unit also includes at least one anisotropic low pass filter. The anisotropic low pass filter is to adaptively filter sampled data from the bilinear low pass filter for the first MIP map and the second MIP map. Additionally, the graphics processing unit includes at least one sampler unit, and the sampler unit is to sample the output of the bilinear low pass filter and the anisotropic low pass filter.

The graphics processing unit may combine the results of the anisotropic sampling on the first MIP map and the second MIP map as a weighted sum based on a fractional part. The graphics processing unit may compute an effective number of ways for each of the first MIP map and the second MIP map, and each of the first MIP map and the second MIP map may be sampled based on the effective number of ways after applying a bilinear filter. A width of the anisotropic low pass filter for each of the first MIP map and the second MIP map may be twice the anisotropic ratio for that MIP. Additionally, the anisotropic low pass filter shape may pass a minimum of higher frequency components beyond an ideal sampling cut-off frequency and a maximum of lower frequency components within the ideal sampling cut-off frequency. Further, the graphics processing unit may filter the first MIP map and the second MIP map by the bilinear low pass filter and then sample each of the first MIP map and the second MIP map at a one-texel interval.

EXAMPLE 3

A system that performs adaptive Gaussian filtering is described herein. The system includes a display, a radio, and a memory that is to store instructions and that is communicatively coupled to the display. The system also includes a processor communicatively coupled to the radio and the memory, wherein when the processor is to execute the instructions, the processor is to calculate a number of ways of anisotropy based on a computed level of detail of a texture map and apply a bilinear low pass filter to a texture map's closest two MIP maps using a processor. When the processor is to execute the instructions, the processor is also to compute an effective number of ways and filter sizes on each of the closest two closest MIP maps and sample the closest two MIP maps at their respective effective number of ways. Further, when the processor is to execute the instructions, the processor is to apply a corresponding sized low pass filters to each of the closest two MIP maps and combine the filtered closest two MIP maps using a weighted sum based on a fractional part of a computed level of detail.

The low pass filter shape may pass a minimum of higher frequency components beyond an ideal sampling cut-off frequency and a maximum of lower frequency components within the ideal sampling cut-off frequency. The signal filtered by the bilinear low pass filter may be sampled at a one-texel interval on each corresponding MIP map. An adaptive anisotropic low pass filter may be enabled by first computing the number of bilinear samples to be obtained from each MIP map. Additionally, the effective number of ways for each of the two closest MIP maps may be computed by first computing the anisotropic ratio on each MIP map from an original anisotropic ratio by multiplying by a power of two of the fractional LOD for a lower MIP map of the two closest MIP maps, and dividing for a higher MIP map of the two closest MIP maps. A width of the anisotropic low pass filter for each of the two closest MIP maps may be twice the anisotropic ratio for each MIP map, and the width may determine the number of ways. Moreover, the adaptive anisotropic filtering may be performed using a Gaussian filter, a triangle filter, or any filter that passes a minimum of higher frequency components beyond an ideal sampling cut-off frequency and a maximum of lower frequency components within the ideal sampling cut-off frequency.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the present techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. A method for adaptive anisotropic filtering, comprising:
   calculating a number of ways of anisotropy based on a computed level of detail of a texture map;
   applying a bilinear low pass filter to a texture map's closest two MIP maps using a processor;
   computing an effective number of ways and filter sizes on each of the closest two closest MIP maps, wherein computing the effective number of ways for each of the two closest MIP maps comprises first computing the anisotropic ratio on each MIP map from an original anisotropic ratio by multiplying by a power of two of the fractional level of detail for a lower MIP map of the two closest MIP maps, and dividing for a higher MIP map of the two closest MIP maps;
   sampling the closest two MIP maps at their respective effective number of ways;
   applying a corresponding sized low pass filter to each of the closest two MIP maps; and
   combining the filtered closest two MIP maps using a weighted sum based on a fractional part of a computed level of detail.

2. The method of claim 1, further comprising a shape of the low pass filter passing a minimum of higher frequency components beyond an ideal sampling cut-off frequency and a maximum of lower frequency components within the ideal sampling cut-off frequency.

3. The method of claim 1, further comprising sampling the signal filtered by the bilinear low pass filter at a one-texel interval on each corresponding MIP map.

4. The method of claim 1, further comprising an adaptive anisotropic low pass filter that is enabled by first computing the number of bilinear samples to be obtained from each MIP map.

5. The method of claim 1, further comprising a width of the anisotropic low pass filter for each of the two closest MIP maps that is twice the anisotropic ratio for each MIP map, and the width determines the number of ways.

6. The method of claim 1, further comprising performing the adaptive anisotropic filtering using a Gaussian filter, a triangle filter, or any filter that passes a minimum of higher frequency components beyond an ideal sampling cut-off frequency and a maximum of lower frequency components within the ideal sampling cut-off frequency.

7. A graphics processing unit, comprising:
   at least one bilinear low pass filter, wherein the bilinear low pass filter is to filter data for a first MIP map and a second MIP map, and data from each MIP map represents a two by two group of texels, and wherein the two by two group of texels is nearest to a desired position on the first MIP map and the second MIP map, respectively;
   at least one anisotropic low pass filter, wherein the anisotropic low pass filter is to adaptively filter sampled data from the bilinear low pass filter for the first MIP map and the second MIP map, wherein a width of the anisotropic low pass filter for each of the first MIP map and the second MIP map is twice the anisotropic ratio for that MIP; and at least one sampler unit, wherein the sampler unit is to sample the output of the bilinear low pass filter and the anisotropic low pass filter.

8. The graphics processing unit of claim 7, wherein the graphics processing unit combines results of the anisotropic sampling on the first MIP map and the second MIP map into a weighted sum based on a fractional part.

9. The graphics processing unit of claim 7, wherein the graphics processing unit computes an effective number of ways for each of the first MIP map and the second MIP map, and each of the first MIP map and the second MIP map is sampled based on the effective number of ways after applying a bilinear filter.

10. The graphics processing unit of claim 7, wherein a shape of the anisotropic low pass filter passes a minimum of higher frequency components beyond an ideal sampling cut-off frequency and a maximum of lower frequency components within the ideal sampling cut-off frequency.

11. The graphics processing unit of claim 7, wherein the graphics processing unit filters the first MIP map and the second MIP map by the bilinear low pass filter and then samples each of the first MIP map and the second MIP map at a one-texel interval.

12. A system that performs adaptive Gaussian filtering, comprising:
a display;
a radio;
a memory that is to store instructions and that is communicatively coupled to the display; and
a processor communicatively coupled to the radio and the memory, wherein when the processor is to execute the instructions, the processor is to:
calculate a number of ways of anisotropy based on a computed level of detail of a texture map;
apply a bilinear low pass filter to a texture map's closest two MIP maps using a processor;
compute an effective number of ways and filter sizes on each of the closest two closest MIP maps, wherein computing the effective number of ways for each of the two closest MIP maps comprises first computing the anisotropic ratio on each MIP map from an original anisotropic ratio by multiplying by a power of two of the fractional level of detail for a lower MIP map of the two closest MIP maps, and dividing for a higher MIP map of the two closest MIP maps;
sample the closest two MIP maps at their respective effective number of ways;
apply a corresponding sized low pass filters to each of the closest two MIP maps; and
combine the filtered closest two MIP maps using a weighted sum based on a fractional part of a computed level of detail.

13. The system of claim 12, wherein a shape of the low pass filter passes a minimum of higher frequency components beyond an ideal sampling cut-off frequency and a maximum of lower frequency components within the ideal sampling cut-off frequency.

14. The system of claim 12, wherein the signal filtered by the bilinear low pass filter is sampled at a one-texel interval on each corresponding MIP map.

15. The system of claim 12, wherein an adaptive anisotropic low pass filter is enabled by first computing the number of bilinear samples to be obtained from each MIP map.

16. The system of claim 12, wherein a width of the anisotropic low pass filter for each of the two closest MIP maps is twice the anisotropic ratio for each MIP map, and the width determines the number of ways.

17. The system of claim 12, wherein the adaptive anisotropic filtering is performed using a Gaussian filter, a triangle filter, or any filter that passes a minimum of higher frequency components beyond an ideal sampling cut-off frequency and a maximum of lower frequency components within the ideal sampling cut-off frequency.

* * * * *